Oct. 11, 1966

J. W. LONG 3,277,586

DISPLAY PANEL

Filed Sept. 24, 1965

INVENTOR.
JACK W. LONG

BY
Head & Johnson

ATTORNEYS

Oct. 11, 1966  J. W. LONG  3,277,586
DISPLAY PANEL
Filed Sept. 24, 1965  3 Sheets-Sheet 2
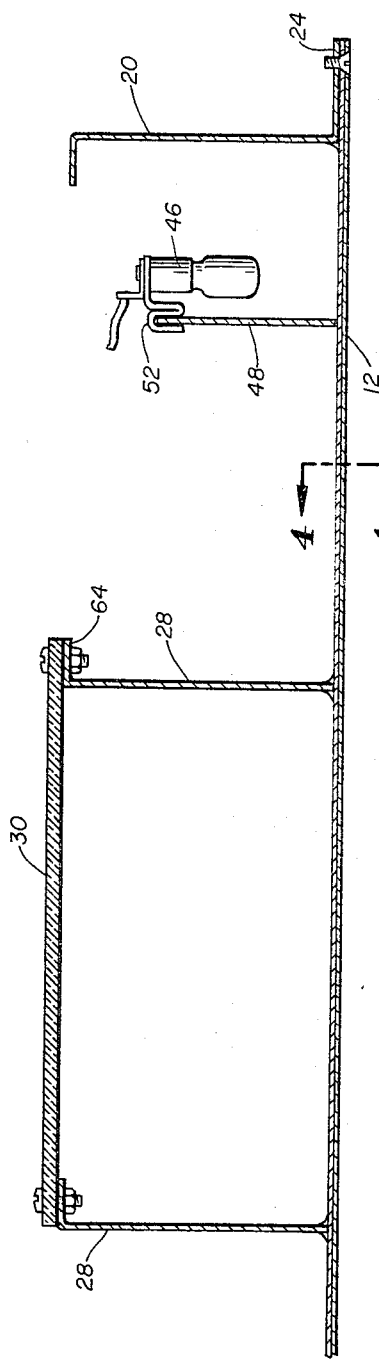
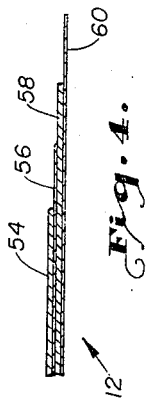
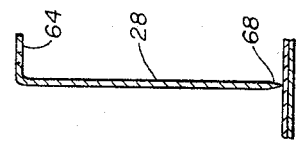
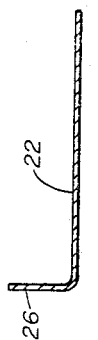
INVENTOR.
JACK W. LONG
BY
Head & Johnson
ATTORNEYS Oct. 11, 1966

J. W. LONG 3,277,586

DISPLAY PANEL

Filed Sept. 24, 1965

INVENTOR.
JACK W. LONG

BY

*Head & Johnson*

ATTORNEYS

# United States Patent Office 3,277,586
Patented Oct. 11, 1966

3,277,586
DISPLAY PANEL
Jack W. Long, Tulsa, Okla., assignor to General Engineering and Manufacturing Company, Inc., Tulsa, Okla., a corporation of Oklahoma
Filed Sept. 24, 1965, Ser. No. 489,949
2 Claims. (Cl. 35—1)

This invention relates to display devices, and more particularly to teaching devices in the form of a training panel in which instructional material appears by cooperation of various light sources. Still more particularly, this invention relates to a teaching device in which instructional material is displayed on a training panel by means of light sources positioned behind the panel.

Teaching devices which incorporate a back lighted training panel are employed to accelerate the training of new employees in various highly technical fields or to make more efficient, the retraining of established employees in newly developed technical systems. For example, such training devices are used for familiarizing technical personnel with highly complicated flow systems with which they will eventually be working wherein flow lines and valve systems are made visible from one side of the training panel by a system of lights penetrating desired transparent or translucent portions of the panel. These devices consist of a light penetrable panel in which certain desired areas are allowed to remain transparent while the flow lines and other components are described by making portions of the panel opaque. Thus, when the panel is back lighted, the light shining through the transparent areas will clearly set forth the desired flow line or component. The inter-relationship of the components of the system being studied are vividly displayed through this visual means and become strongly impressed upon the person being instructed. The various flow lines, circuits, and components are generally indicated by illuminated areas which may be of different colors. Illuminated areas of different colors may be provided by electric lights of different colors on the back of the panel to provide for the colors desired.

The training devices currently used are usually made of an egg carton type structure on the back of the panel which provides a rigid, compartmented structure. Such a structure is formed from a number of interlaced thin sheets positioned vertically against the panel itself to provide a large number of cubical or rectangular compartments. A series of detachable electric lights are placed within the various compartments to conform to a design provided on the face of the panel. For example, a number of electric lights can be included on a single circuit and arranged in a series of adjoining compartments so that when the circuit is completed, the light will shine through a transparent or translucent portion of the panel corresponding to that sequence of compartments so that the design as viewed from the front of the panel will be in the form of a narrow flow line. However as stated, the compartmented structure is fixed, which severely limits the design capabilities of the structure and undesirably breaks up the light pattern by causing thin shadows at each compartment edge.

The primary object of this invention is to provide a teaching device upon which a variety of illuminated and non-illuminated information and data may be displayed.

Another object of this invention is to provide a teaching device for the display of illuminated and non-illuminated information and data in which the information and data may be efficiently and conveniently rearranged without destruction of the device.

Still another object of this invention is to provide a teaching device for the display of illuminated information and data in which the sources of illumination may be rapidly and conveniently rearranged without destruction or complete disassembly of the device itself.

Further objects and advantages of the invention will become apparent from the following description and claims, and from the accompanying drawings, wherein:

FIGURE 3 is a cross-sectional view of a portion of a device prepared according to this invention along the lines 3—3 of FIGURE 1.

FIGURE 4 is a cross-sectional view of a portion of a front panel of this invention along the lines 4—4 of FIGURE 3.

FIGURE 5 is a cross-sectional view of an end light partition member of the invention along the lines 5—5 of FIGURE 1.

FIGURE 6 is a cross-sectional view of a top and bottom light partition member of the invention along the lines 6—6 of FIGURE 1.

FIGURE 7 is a partial top elevational view of a support member of the invention near one end of the member.

FIGURE 8 is a cross-sectional view of a vertical partition member of the invention along the lines 8—8 of FIGURE 1 showing the alteration of a support member to provide improved illumination upon the front panel.

The teaching device of this invention comprises a display panel secured to a framework of strong, rigid support members to give strength to the device and provide means for attachment of other components. The display panel is prepared from a normally transparent material and is made opaque in certain areas to conform to a desired design. The design is made vividly visible by illumination from behind. Various means of partitioning are provided for attachment of members on the rear of the panel to conform generally to the desired design so that stray light will not illuminate design areas which may be preferentially darkened. Thus, a potentially unlimited form of intricate designs for flow lines, circuits, or processes may be provided on the face of the display panel by the proper combination of transparent areas of the panel itself with properly placed and blocked illumination on the rear of the panel. By the proper placement of different colored lights along a flow line, it is even possible to cause the line to gradually change color from one area of the panel to another, an effect not possible with a rigidly compartmented structure.

Figure 1:
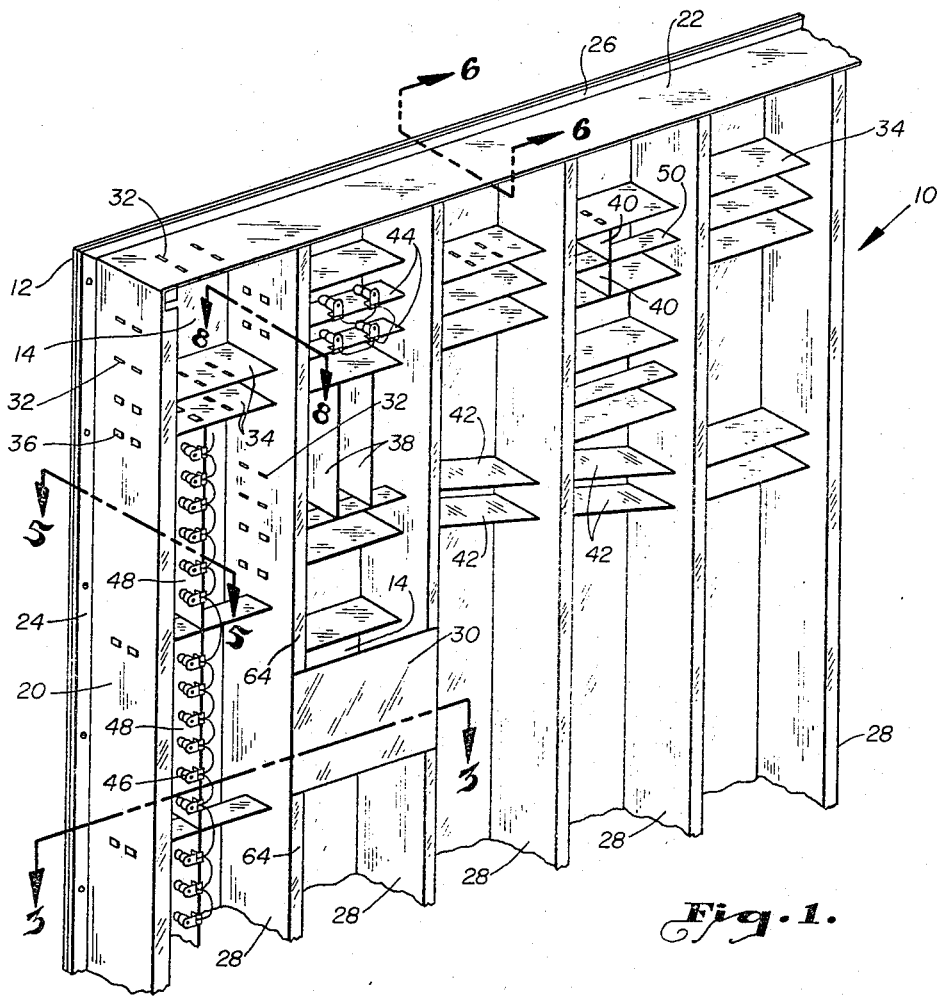
FIGURE 1 is a rear isometric view of a portion of a device prepared according to this invention.
Figure 2:
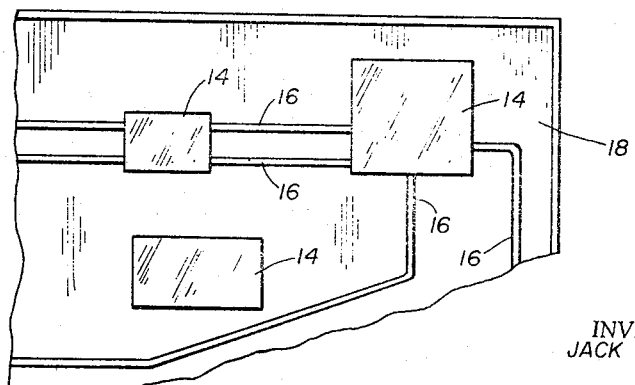
FIGURE 2 is a front elevational view of a portion of the device described in FIGURE 1.

Referring now to the figures in detail, in FIGURE 1 is shown a display device, indicated generally by the numeral 10, prepared according to the present invention. The display device comprises numerous components secured to the rear of a panel member 12 which has a number of transparent areas and a number of other areas which may be made opaque at will. By choosing the areas which are to be transparent and those which are to be opaque, various designs may be made upon the panel 12. For example, a design may be prepared on the face of panel 12 such as that shown in FIGURE 2, in which transparent areas 14 may represent large components of a flow system or process and transparent areas 16 may represent flow lines, the transparent areas being determined by the extent of opaque covering 18. The opaque areas may be made so by painting of portions of the normally light-transmitting panel, or by covering of portion of the panel by masking.

Referring back now to FIGURE 1, it is shown how numerous components of the invention may be positioned upon the rear of panel 12 to provide back lighting for the chosen design upon the face of panel 12. Another function of the components mounted on the rear of panel 12 is to provide strength and rigidity to the display device since panel 12 is a relatively thin sheet of glass or plastic material, material which may vary in light transmitting qualities from transparent to various degrees of translucency. The display device 10 is supported largely by a pair of edge members 20 secured adjacent opposite edges of panel 12, and a pair of edge members 22 secured adjacent the other two edges of panel 12 assuming panel 12 to be of rectangular construction. When panel 12 is constructed to have four edges, a pair of edge members 20 will be arranged along two opposite edges, and a pair of edge members 22 will be arranged along the remaining two edges, with each edge member 20 secured to an adjacent edge member 22 at a corner of panel 12. The manner of securing members 20 and 22 to each other may be conventional, as for example, by bolting each to angle member. The edge members 20 and 22 may be attached to the panel 12 by conventional means, but preferably, edge members 20 and 22 are bonded to panel 12 by means of a synthetic resin. Edge member 20 has a panel abutting flange 24 which provides the means for bonding member 20 to panel 12. The conformation of member 20 is more clearly shown in the cross-sectional view of FIGURE 5. Member 22 has a panel abutting flange 26 which provides the means by which this member is bonded to panel 12.

The display device includes a number of support members 28 which serves several purposes. These members give additional support and rigidity to the display device, provide a means for connection of other components to the device, and also act as light partitions. Preferably, for greatest strength support members 28 are equally spaced and parallel to each other, and extend entirely across one dimension of the display panel 12. Support members 28 are connected by conventional means to edge members 22 and are bonded to panel 12 along the edge of member 28 which abuts panel 12. Preferably, the support members 28 are mounted so that they will be in a vertical position on the finished display panel, but it can readily be seen that for some purposes it might be advantageous to have the support members 28 running horizontally. The substantial support provided by support members 28 permits mounting of other components on the support members 28, as for example, a special mounting panel 30 of a kind which will provide support for motors, large animated components, or other special devices. The mounting panel 30 may be removably attached to support members 28 by any conventional means, such as nuts and bolts or metal screws. Edge members 20 and 22 as well as support members 28 are provided with a series of slot openings 32 which in turn provide means for attachment of other components of the display device as hereinafter described.

The proper back lighting of the design to be illuminated on the panel is provided by a number of removable panels arranged in a distinct manner with reference to the edge members 20 and 22 and support members 28 as well as with each other to provide proper lighting of the design. Several forms of removable panels are provided for this purpose. In FIGURE 1 several variations are shown. One form of removable panel is in the form of a light dam 34; which light dams are of uniform construction so that they may fit interchangeably perpendicularly between support members 28. The light dams are designed so that one end fits flush with the back side of panel 12 as they are held securely in position by means of tabs 36 on the ends of the light dams which tabs pass through openings 32 and are secured by either twisting or bending. Light dams 34 also include a number of slots 32 preferably positioned at regular intervals so that other light dams 34 may be secured thereto or that other specially designed panel members may be used. For most purposes the spacing of slots 32 and tabs 36 should be uniform so that the light dams and other removable panel components may be used interchangeably. Of course, where a unique design might require a specialized arrangement of light dams, slots 32 may be positioned to conform to the specialized arrangement. Besides the numerous regularly shaped light dams 34, FIGURE 1 also describes a number of specialized configurations of light dams. For example, light dams 38 are a longer form of this component and at the same time demonstrate the facility with which the light dams may be secured between other light dams instead of always between support members 28. Also, FIGURE 1 shows a specialized light dam 40 which is of shorter length than the usual component. A series of specialized light dams 42 are also shown to demonstrate the use of this component in outlining diagonal areas between support members. When used for the purpose described by light dams 42, these components may be custom made to the prescribed length and may be designed to fit specially formed slots in the support members 28 or other panels. Of course, besides being diagonally placed between adjacent support members 28, specialized lengths of light dams similar to light dams 42 could be diagonally positioned between other adjacent light dam members or panel components. In addition, besides being arranged for diagonal placement between support members 28, other specialized forms of light dams may take a curved position so that they may outline curved designs upon the panel. Or, it is possible even to arrange a light dam in a complete circular arrangement with the light dam itself attached to some other panel component.

The lighting to be provided by the display device is preferably made up of a plurality of light bulbs in circuit arrangement whereby each component of the preferred design may be back lighted by a single circuit of lights. For example, a single flow line may be given a back lighting effect by means of a single circuit of lights disposed between the light dam members on the rear of the panel which proscribe that particular flow line. The lights are preferably removably attached by a conventional socket and bracket attachment means to the panel components, for example, light dams 34, or to a specially designed light hanger 44. FIGURE 1 shows a number of lights 46 detachably attached to an extra long light dam 48 so as to illuminate a flow line 16 as it would appear on the face of the panel as in FIGURE 2. Light bulbs 46 are bracketed on light hangers 44 usually when a larger than average area is to be illuminated. Light hangers 44 are positioned spaceably away from panel 12 so that the light will diffuse around light hanger 44 to illuminate evenly a larger area. In FIGURE 1 a number of light bulbs are shown arranged on adjacent light hangers as they would be in illuminating an area 14. Light hangers 44 can be modified in the same way as light dams 34 in that they may be given various lengths or configurations. A shorter modification of the light hanger is shown in FIGURE 1 by light hanger 50. In FIGURE 3 it is shown how the lights are held in position over the panel components by means of a simple bracket clamp 52.

FIGURE 4 describes a preferred embodiment of the panel 12 shown in cross section. The panel is preferably formed of a thin sheet of translucent Fiberglas 54 which is bonded by a layer of transparent adhesive 56 such as an epoxy resin to a thin sheet of clear Fiberglas 58. In areas where it is not desired to have any back illumination showing through the panel, the clear Fiberglas layer 58 which is at the front of the panel may be made opaque by covering with a layer of paint 60. It has been found preferably to position the translucent Fiberglas 54 towards the rear of the panel, although the reverse arrangement would also be operative. Placing the translucent Fiberglas layer 54 to the rear seems to enhance the diffusion of light.

FIGURE 5 is a cross-sectional view of end member 20 to show more clearly the configuration of this component. As described above, end member 20 is secured preferably to the rear of panel 12 by means of a bonding agent such as a synthetic epoxy resin. Flange 62 of member 20 is provided so that additional components may be attached to the rear of the panel.

FIGURE 6 is a cross-sectional view of edge member 22 to show more clearly the configuration of that member. Member 22 is secured to the rear of panel 12 preferably by bonding flange 26 to the panel 12 with epoxy resin.

FIGURE 7 describes a portion of a support member 28 to include one end of the member 28 where it abuts an edge member 22. Support member 28 includes a top flange 64 running substantially the length of support member 28 which flange provides means for attachment of other components to the support member and by its configuration provides additional strength for the support member and the display device itself. An end flange 66 is provided so that support member 28 may be easily secured to edge members 22 at either or both ends of the support member 28. Conventional means of attachment may be used in securing support member 28 to edge member 22, for example, nuts and bolts or metal screws.

FIGURE 8 discloses how a support member 28 may be modified where a portion of the illuminated design might otherwise be interrupted by the pattern of a support member 28. Comparing FIGURES 1 and 2, it is seen that horizontal illuminated lines 16 would otherwise be dissected periodically by the narrow shadows presented by vertical support members 28 crossing the design. But, by forming a portion of a support member 28 in the configuration of a knife edge 68, or the like, the shadow of support member 28 will be eliminated. Knife edge 68 need be present only for a short distance along support member 28 where the support member 28 actually is crossed by a flow line 16.

Figure 9:
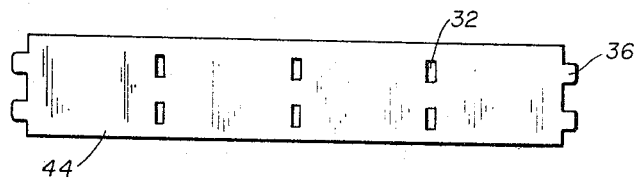
FIGURE 9 is a front elevational view of a typical light hanger member of the invention.
Figure 10:
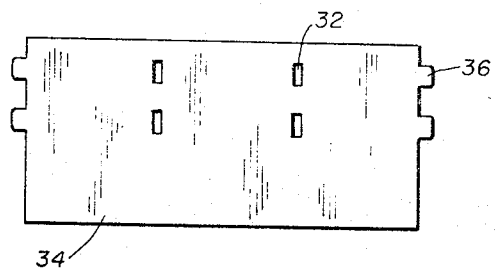
FIGURE 10 is a front elevational view of a typical light dam member of the invention.

FIGURES 9 and 10 are side elevational views of a light hanger 44 and a light dam 34 respectively, to show the relative variance in width between these two components. As mentioned above, each of these components may be of varying length, and where specialized construction is required, the positioning of slots 32 may be adjusted accordingly. But wherever possible, these components are prepared of regularly uniform dimension to provide simple and quick construction and insure an interchangeability of parts.

Figure 11:
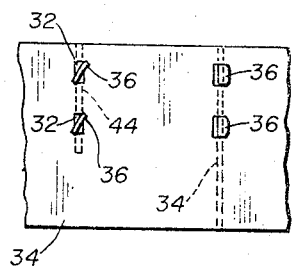
FIGURE 11 is a side elevational view of a portion of a light dam member of the invention showing two means of attachment of other components.
Figure 12:
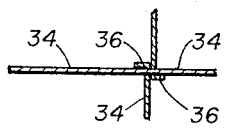
FIGURE 12 is a top elevational view of several components of the invention showing a specialized quick connection means.

FIGURE 11 describes how the various components of the invention are quickly assembled. For example, this figure shows the manner in which the tabs 36 of both a light hanger 44 and light dam 34 are passed through slots 32 of another light dam 34 and the two manners in which these tabs may be secured. One method is simply by twisting the end of the tab 36 which extends beyond the slot 32. The other method of attachment is to bend the tab 36 at approximately a right angle back against the component through which the tab is passed. Connecting the components of this invention by passing tabs 36 through respective slots 32 and bending the tab 36 at substantially a right angle is a necessary means of connection where two components of the invention are secured to the same third component in such a manner that a tab 36 of the first two components passes through a same slot 32 of a third component. FIGURE 12 demonstrates this type of connection and shows three light dams 34 secured to each other.

Since many different embodiments of this invention may be made without departing from the spirit and scope thereof, it is to be understood that the specific embodiments described in detail herein are not to be taken in a limiting sense, since the scope of the invention is best defined by the appended claims.

What is claimed:
1. A display device comprising:
   a supporting rectangular framework having spaced paralleled vertical side frame members, and spaced paralleled horizontal top and bottom frame members perpendicular to and affixed at each end to said side frame members;
   a plurality of paralleled spaced thin planar support members affixed at each end to opposed frame members;
   a plurality of light, dam forming, thin, planar partition members detachably secured in selectably spaced relationship between adjacent support members, said frame members and partition members presenting front edges in a single plane, all of said members being perpendicular to said plane;
   a sheet of light diffusing translucent plastic affixed at the inner surface to the planar presented front edges of said frame and partition members, the front edge of each of said support members being convergingly tapered to a knife edge presenting a substantially visually imperceptible contact with the inner surface of said translucent plastic sheet; and
   a plurality of lights detachably secured to the rear edges of said partition members.
2. A display device according to claim 1 including:
   a layer of transparent adhesive on the outer surface of said transparent sheet;
   a sheet of transparent plastic bonded to the outer surface of said translucent sheet by said layer of transparent adhesive, said transparent plastic sheet adaptable to receive opaquing paint thereon.

References Cited by the Examiner
UNITED STATES PATENTS

| | | | |
|---|---|---|---|
| 1,460,953 | 7/1923 | Fairbanks. | |
| 2,948,074 | 8/1960 | Dupree | 40—130 |
| 2,952,079 | 9/1960 | Koch | 35—1 |
| 2,985,968 | 5/1961 | Koch | 35—1 |
| 3,040,444 | 6/1962 | Koch | 35—1 |
| 3,194,954 | 7/1965 | Locke | 35—1 X |
| 3,197,903 | 8/1965 | Walley | 40—130 |

EUGENE R. CAPOZIO, *Primary Examiner.*

S. M. BENDER, *Assistant Examiner.*